United States Patent [19]

Yoshimaru et al.

[11] Patent Number: 5,582,771

[45] Date of Patent: *Dec. 10, 1996

[54] METHOD FOR PREPARING ELECTRICALLY-CONDUCTIVE NEEDLE-LIKE ZINC OXIDE

[75] Inventors: Katsuhiko Yoshimaru, Saitama; Hiroyuki Tokuichi; Mitsuhiko Hasuo, both of Fukuoka, all of Japan

[73] Assignee: Mitsui Mining & Smelting Co., Ltd., Tokyo, Japan

[ * ] Notice: The term of this patent shall not extend beyond the expiration date of Pat. No. 5,560,871.

[21] Appl. No.: 149,235

[22] Filed: Nov. 9, 1993

[30] Foreign Application Priority Data

Nov. 9, 1992 [JP] Japan .................... 4-322256

[51] Int. Cl.$^6$ .................... H01B 1/08; H01B 1/16
[52] U.S. Cl. .................... 252/518; 423/623; 430/56; 430/60; 430/62
[58] Field of Search .................... 252/518; 423/623; 430/56, 60, 62

[56] References Cited

U.S. PATENT DOCUMENTS

| | | | |
|---|---|---|---|
| 1,522,097 | 1/1925 | Breyer et al. | |
| 2,331,599 | 10/1993 | Cyr | 423/623 |
| 4,623,601 | 11/1986 | Lewis et al. | 430/69 |
| 5,089,248 | 2/1992 | Akhtar | 423/604 |
| 5,102,650 | 4/1992 | Hayashi et al. | 423/622 |
| 5,171,364 | 12/1992 | Sato et al. | 106/425 |

FOREIGN PATENT DOCUMENTS

| | | |
|---|---|---|
| 780787 | 3/1968 | Canada . |
| 405364 | 6/1990 | European Pat. Off. . |
| 120518 | of 1981 | Japan . |
| 56-120518 | 9/1981 | Japan . |
| 1252600 | 10/1989 | Japan . |
| 328125 | 2/1991 | Japan . |
| 60429 | 3/1991 | Japan . |
| 360429 | 3/1991 | Japan . |
| 3150299 | 6/1991 | Japan . |
| 4349118 | 12/1992 | Japan . |
| 1084062 | 1/1965 | United Kingdom . |

*Primary Examiner*—Paul Lieberman
*Assistant Examiner*—Gregory R. Delcotto
*Attorney, Agent, or Firm*—Sughrue, Mion, Zinn, Macpeak & Seas

[57] ABSTRACT

Herein disclosed is a method for preparing electrically-conductive needle-like zinc oxide which comprises the steps of preparing a vapor mixture by admixing zinc vapor and vapor of at least one compound selected from the group consisting of dopant-forming compounds having boiling points of not more than the boiling point of zinc and free of oxygen atom in an amount of 0.005 to 5 parts by weight, as expressed in terms of the oxide of the dopant-forming metal, per 100 parts by weight of the zinc vapor as expressed in terms of zinc oxide; and passing the vapor mixture through an oxidation chamber while blowing an oxidizing gas into the vapor mixture through at least two nozzles spaced apart from one another and arranged along the flow path of the vapor mixture to thus stepwise oxidize the vapor mixture.

6 Claims, 2 Drawing Sheets

METHOD FOR PREPARING ELECTRICALLY-CONDUCTIVE NEEDLE-LIKE ZINC OXIDE

BACKGROUND OF THE INVENTION

1. Field of the Invention

The present invention releates to a method for preparing electrically-conductive needle-like zinc oxide and more specifically to a method for preparing electrically-conductive needle-like zinc oxide which permits, at low cost and high efficiency, the preparation of the electrically-conductive needle-like zinc oxide which is highly pure, which has a high whiteness, a three-dimensionally branched needle-like shape and a low powder specific resistance of little dispersion because a dopant is uniformly dispersed.

2. Description of the Prior Art

Zinc oxides are useful as, for instance, pigments kneadable with paints and varnishes, resins, rubbers and fibers and there has been desired for the development of zinc oxides having excellent electrically-conductivity, in particular, in antistatic applications. Among these zinc oxides, those having unbranched needle-like or branched needle-like (tetrapod-like) shapes (hereinafter generically referred to as "needle-like zinc oxides") are excellent in that a electrically-conductive network can be constructed through the addition thereof in an amount smaller than that required for granular zinc oxide. For this reason, there has been required for the development of zinc oxide having a high electrically-conductivity and a needle-like shape.

As a method for preparing needle-like zinc oxide, in particular, three-dimensionally branched (tetrapod-like) zinc oxide, there has been known the so-called "American Method" which comprises oxidizing zinc vapor containing a reducing gas. However, the resulting zinc oxide has a high powder specific resistance and is a mixture with conglomerates thereof or the resulting zinc oxide contains, for instance, lead and cadmium in an amount on the order of 1000 ppm, even if it substantially comprises needle-like zinc oxide. Thus, the product obtained according to this method is not favorable for use as an auxiliary and an additive.

Moreover, there have also been known other methods such as a method comprising subjecting metal zinc vapor combustion and oxidation and quenching the resulting zinc oxide immediately after the combustion and oxidation (see Japanese Unexamined Patent Publication (hereinafter referred to as "J.P. KOKAI") No. Sho 56-120518); a method comprising heat-treating oxidized layer-containing powdery zinc in an oxygen-containing atmosphere to give zinc oxide (see J.P. KOKAI No. Hei 1-252600); a method comprising neutralizing a solution containing an alkali metal zincate compound and a salt of a specific metal such as aluminum to thus co-precipitate these salts and then calcining the co-precipitates in a reducing atmosphere (see J.P. KOKAI No. Hei 3-28125); a method comprising adding an ammonium carbonate aqueous solution and an aluminum sulfate aqueous solution to a dispersion of needle-like zinc oxide, then dehydrating the mixture after stirring over a predetermined time period and calcining the dehydrated product in a reducing atmosphere (see J.P. KOKAI No. Hei 3-60429); and a method comprising vaporizing zinc powder or zinc metal by indirectly heating it to thus oxidize the vaporized zinc metal (zinc vapor) (see J.P. KOKAI No. Hei 3-150299). However, these methods are not suitable for mass-production of desired zinc oxide. Further they require the use of large amounts of alkalis and large amounts of acids and this becomes a cause of a problem concerning production facilities and results in low production efficiency. They include calcination processes carried out in reducing atmospheres and, therefore, the resulting electrically-conductive needle-like zinc oxide has a tinge of grayish color or an insufficient whiteness. In addition, the powder specific resistances thereof are high and are not satisfactorily stable since the resulting products do not comprise any dopant. Moreover, the electrically-conductivity of the resulting needle-like zinc oxide is still insufficient and there remains a room for further improvement.

SUMMARY OF THE INVENTION

Accordingly, an object of the present invention is to provide a method for preparing electrically-conductive needle-like zinc oxide which permits, at low cost and high efficiency, the preparation of the electrically-conductive needle-like zinc oxide which is highly pure, which has high whiteness, which mainly has a three-dimensionally branched needle-like shape, which shows little dispersion in the powder specific resistance since a dopant is uniformly dispersed therein.

The inventors of this invention have conducted various studies to accomplish the foregoing object, have found out that the foregoing object can effectively be achieved by stepwise oxidizing a vapor mixture comprising zinc vapor and vapor of a dopant-forming metal compound in a specific ratio and thus have completed the present invention.

According to the present invention, there is provided a method for preparing electrically-conductive needle-like zinc oxide which comprises the steps of preparing a vapor mixture by admixing zinc vapor and vapor of at least one compound selected from the group consisting of dopant-forming compounds having boiling points of not more than the boiling point of zinc and free of oxygen atom in an amount of 0.005 to 5 parts by weight, as expressed in terms of the oxide of the dopant-forming metal, per 100 parts by weight of the zinc vapor as expressed in terms of zinc oxide; and passing the vapor mixture through an oxidation chamber while blowing an oxidizing gas into the vapor mixture through at least two nozzles spaced apart from one another and arranged along the flow path of the vapor mixture to thus stepwise oxidize the vapor mixture.

DESCRIPTION OF THE PREFERRED EMBODIMENTS

Figure 1:
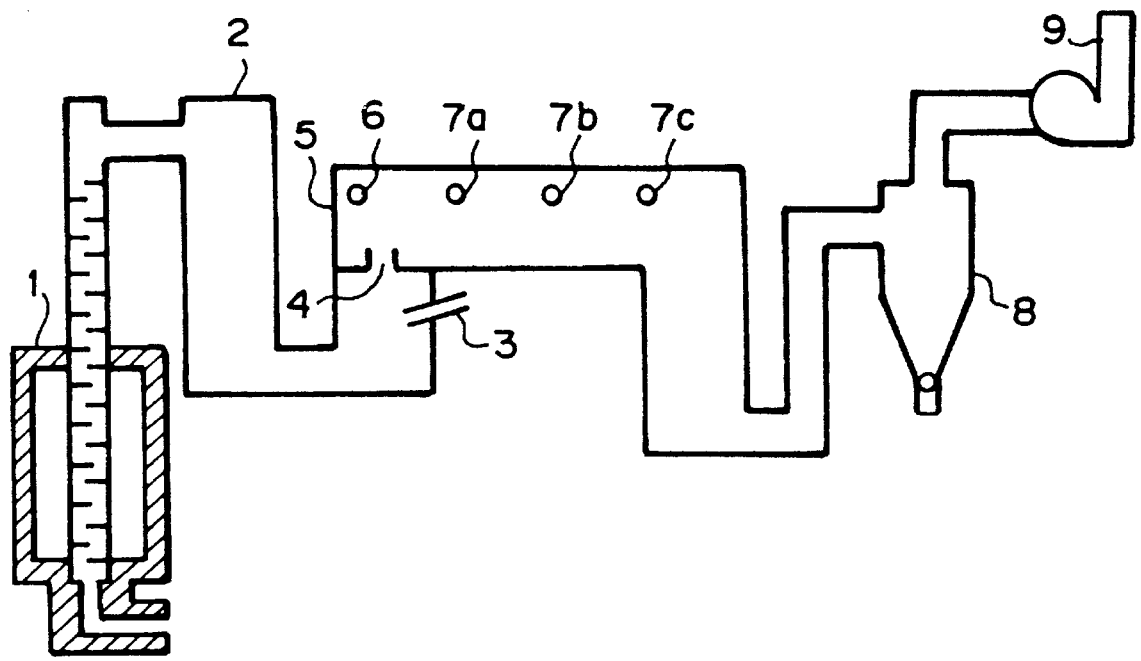
FIG. 1 is a diagram schematically illustrating an apparatus used in the method for preparing electrically-conductive needle-like zinc oxide according to the present invention.
Figure 2:
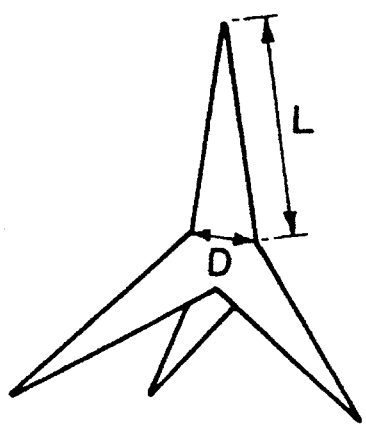
FIG. 2 is a diagram schematically illustrating a three-dimensionally branched needle-like crystal of electrically-conductive zinc oxide having a length of L and a diameter D as determined at the base portion thereof.

The method according to the present invention will hereinafter be explained in mode detail.

The dopant-forming metal compounds used in the present invention are compounds having boiling points of not more than the boiling point of zinc and free of oxygen atom. This because if a dopant-forming metal compound having a boiling point higher than that of zinc is employed, the vapor thereof causes condensation when mixed with zinc vapor having a temperature lower than the boiling point of the compound. Accordingly, it is difficult to convert the dopant-forming metal compound into a dopant and further an excess energy is required for vaporization of a compound having such a high boiling point. On the other hand, the use of an oxygen-containing dopant-forming metal compound results in formation of an oxide of the metal when the vapor of the compound is exposed to a high temperature and the metal oxide formed does not serve as a dopant at all.

The dopant-forming metal compounds used in the present invention are, for instance, compounds of trivalent, tetravalent or pentavalent metals commonly used as dopants such as Al, Ga, In, Sn, Ge and Si (e.g., halides (preferably chlorides or bromides) and organometal compounds of these metals) and specific examples thereof include $AlCl_3$, $GaCl_3$, $InCl_3$, $SnCl_4$, $GeCl_4$, $SiCl_4$, $AlBr_3$ and $SnBr_4$.

In the method of the present invention, the vapor mixture comprising zinc vapor and vapor of the dopant-forming metal compound can easily be prepared by injecting, through a nozzle, the dopant-forming metal compound in the form of vapor or in the form of fine powder suspended in an inert gas as a carrier into a stream of the zinc vapor prior to the introduction thereof into an oxidation chamber. In this respect, the dopant-forming metal compound which is injected into the zinc vapor in the form of fine powder is vaporized during passing through the nozzle due to the sensible heat of the zinc vapor maintained at a temperature of, for instance, 910° C. or after it is injected into the zinc vapor through the nozzle and before it enters into the oxidation chamber to thus form a vapor mixture with the zinc vapor. At this injection process, the amount of the vapor of the dopant-forming metal compound is controlled to a range of from 0.005 to 5 parts by weight (as expressed in terms of the oxide of the dopant-forming metal compound) per 100 parts by weight of zinc (as expressed in terms of zinc oxide). If the amount of the dopant-forming metal compound is less than the lower limit defined above, the resulting electrically-conductive needle-like zinc oxide often has an insufficient electrically-conductivity, while if it exceeds the upper limit, the effect due to the addition of the dopant is not increased any more in proportion to the added amount thereof and the whiteness of the resulting product is inversely apt to decrease.

In the present invention, the foregoing vapor mixture is stepwise oxidized by blowing, into the oxidation chamber, an oxidizing gas through at least two nozzles spaced apart from one another and arranged along the flow path of the vapor mixture during passing the vapor mixture through the oxidation chamber. The oxidizing gases include, for instance, air, air rich in oxygen and pure oxygen gas, but air is generally used. In the method of the invention, at least two nozzles for injecting the oxidizing gas are arranged along the flow path of the vapor mixture at positions spaced apart from one another, i.e., the oxidizing process must be a multistage process comprising at least two stages. The use of only one nozzle for injecting the oxidizing gas into the chamber does not permit the formation of electrically-conductive zinc oxide exclusively comprising needle-like crystals of zinc oxide and allows the formation of only electrically-conductive zinc oxide comprising a mixture of needle-like crystals and granular particles of zinc oxide, or conglomerates thereof. In the oxidation of the zinc vapor, the amounts of the oxidizing gas injected through the nozzles for injecting the gas should be controlled in such a manner that the oxidation reaction is not completed only by injecting the gas into the chamber through a first nozzle. In the method of the present invention, the amount of the oxidizing gas injected through each of the nozzles spaced apart from one another is desirably selected so that it satisfies the following relation:

$A\ (\%) = (105 \sim 170)/n$ (wherein A represents a rate (%) of the amount (equivalent) of the injected oxygen gas relative to the flow rate of zinc vapor and n represents the number of nozzles or steps used and is an integer of not less than 2). The smaller the value A, the greater the length of the resulting needle-like crystal. The oxidation stages arranged along the flow path of the vapor mixture and spaced apart from one another each may comprise one or a plurality of nozzles. If a plurality of nozzles are used in each stage, they are preferably arranged in such a manner that a straight line connecting these nozzles intersects perpendicularly to the flow direction of the vapor mixture. This ensures the formation of a quite uniform mixture of the vapor mixture and the oxidizing gas.

As has been discussed above, nuclei of needle-like crystals of zinc oxide are first formed by the injection of the oxidizing gas through the first nozzle of the first oxidation stage and then the needle-like crystals stepwise grow when injecting the oxidizing gas through the subsequent nozzle or nozzles according to the method of the present invention. In this way, longer needle-like crystals of electrically-conductive zinc oxide can efficiently be produced by the stepwise oxidation of zinc using a multistage injection-nozzle system of this type.

The method of the present invention permits the production of needle-like crystals of electrically-conductive zinc oxide having three-dimensionally branched needle-like shapes, a needle length (L) ranging from 1 to 50 µm and an aspect ratio ranging from 2 to 25. In this respect, the aspect ratio (L/D) means the ratio of the needle length L of each needle-like crystal to the diameter D of each needle-like crystal as determined at the base portion thereof.

When a halide is used in the present invention as the dopant-forming metal compound, a trace amount of halogen molecules is sometimes adsorbed on the resulting zinc oxide depending on the conditions for the stepwise oxidation. For this reason, if the resulting electrically-conductive zinc oxide is used in applications which may adversely be affected by the presence of a trace amount of halogen molecules (in particular chlorine molecules), hydrogen gas may be added to the oxidizing gas injected into the vapor mixture comprising zinc vapor and vapor of the dopant-forming metal compound in an amount less than the lower explosive limit of the resulting oxidizing gas/hydrogen mixture, or the resulting electrically-conductive needle-like zinc oxide may be washed with water and then dried to give electrically-conductive needle-like zinc oxide free of halogen molecules.

The method according to the present invention will hereinafter be explained in mode detail with reference to the accompanying drawings.

FIG. 1 is a diagram schematically illustrating an apparatus used for practicing the method of the present invention. In FIG. 1, reference numeral 1 represents a rectifying column for purifying zinc, 2 a condenser, 3 a nozzle for injecting vapor or fine powder of a dopant-forming metal compound, 4 a nozzle orifice for injecting a vapor mixture, 5 an oxidation chamber, 6 a nozzle for blowing an inert gas into the oxidation chamber, 7a, 7b and 7c each a nozzle for injecting an oxidizing gas, 8 a bag filter and 9 an aspiration fan respectively. FIG. 1 shows the nozzle 3 for injecting vapor or fine powder of the dopant-forming metal compound in its simplified form, but the structure thereof is not restricted to specific ones so far as they permit the supply of the vapor or fine powder of the dopant-forming metal compound at a predetermined speed.

Zinc is evaporated and refined in the rectifying column 1 for purifying zinc as shown in FIG. 1. The facility for generating zinc vapor may be a retort or an electric furnace, but the foregoing rectifying column for purifying zinc is preferably used in the invention. The zinc vapor thus generated and refined passes through the condenser 2, then uniformly mixed with vapor of a dopant-forming metal compound injected through the nozzle 3 to give a vapor mixture and the resulting vapor mixture is introduced into the oxidation chamber 5 through the vapor mixture-injecting nozzle orifice 4.

At this stage, the vapor mixture-injecting nozzle orifice 4 is covered with an inert gas atmosphere such as nitrogen gas atmosphere at the periphery thereof to prevent any formation of deposits at the orifice. This inert gas atmosphere can be established by injecting, for instance, nitrogen gas through the inert gas-injecting nozzle 6 arranged in the oxidation chamber 5. The temperature around the nozzle orifice is preferably adjusted to a range of from 700° to 1200° C. during the stage. If the temperature is less than 700° C., deposits are easily formed and this leads to clogging of the nozzle, while if it exceeds 1200° C., which indicates that the temperature in the oxidation chamber is extremely high, the resulting electrically-conductive zinc oxide particles do not have needle-like shapes, but are conglomerates. Therefore, it is necessary to detect the temperature of the nozzle orifice and to thus control the temperature of the oxidation chamber to a predetermined range. The temperature control is performed by adjusting the quantity of zinc vapor and the flow rate of the inert gas. To this end, the quantity of zinc vapor is controlled to a ranges of from 3 to 20 kg/h, preferably 5 to 12 kg/h and the flow rate of the inert gas is desirably controlled to a range of from 100 to 200 Nl/min. The operations under these conditions permit inhibition of any formation of powdery electrically-conductive zinc oxide.

The vapor mixture thus introduced into the oxidation chamber 5 is stepwise oxidized with an oxidizing gas injected in the chamber through nozzles 7a, 7b and 7c arranged in the corresponding stages respectively to give needle-like crystals of electrically-conductive zinc oxide. In this stepwise oxidation process, the oxidation reaction must not be completed by only the oxidizing gas injected through the gas-injecting nozzle 7a at the first stage and, therefore, the amount of the oxidizing gas injected through each of the nozzles spaced apart from one another is desirably selected so that it satisfies the following relation:

$$A (\%) = (105 \sim 170)/n$$

(wherein A represents a rate (%) of the amount (equivalent) of the injected oxygen gas relative to the flow rate of zinc vapor and n represents the number of nozzles or steps used and is an integer of not less than 2). The smaller the value A, the greater the length of the resulting needle crystal. The oxidation stages (or zones) arranged along the flow path of the vapor mixture and spaced apart from one another each may be provided with one or a plurality of nozzles. More specifically, the nozzles 7a, 7b and 7c each may comprise one or a plurality of nozzles. If a plurality of nozzles are used in each oxidation zone, they are preferably arranged in such a manner that a straight line connecting these nozzles intersects perpendicularly to the flow direction of the vapor mixture. This ensures the formation of a quite uniform mixture of the mixed vapor and the oxidizing gas.

As has been explained above, the oxidizing gas is injected into the chamber through the injecting nozzles (7b . . . 7n) subsequent to the first oxidizing gas-injecting nozzle 7a to oxidize the unreacted zinc vapor. Thus, nuclei of needle-like crystals of electrically-conductive zinc oxide are formed and grow when injecting the oxidizing gas through the first injecting nozzle 7a and the needle-like crystals further stepwise grow through oxidation of unreacted zinc vapor with the oxidizing gas injected through the injection nozzles (7b . . . 7n) of the subsequent stages. The stepwise oxidation by the use of a multiple injection-nozzle system permits effective production of long needle-like crystals of electrically-conductive zinc oxide. The needle-like crystals of electrically-conductive zinc oxide thus formed are aspirated by the aspiration fan 9 and collected by the bag filter 8.

A dopant is uniformly distributed within each needle-like zinc oxide particle or crystal and each dopant element is substituted with a Zn element in the crystal lattice of zinc oxide since a vapor mixture is subjected to combustion and oxidation with an oxidizing gas according to the present invention. For this reason, the resulting electrically-conductive needel-like zinc oxide has a low, uniform powder specific resistance of little dispersion. Thus, the present invention can eliminate the need for a conventionally used reductive calcination process for stable substitution of Zn elements in the zinc oxide crystal latice with dopant. This permits the elimination of oxygen defects possibly formed in the zinc oxide crystal latice due to the reductive calcination and ensures a high whiteness of the resulting product. Moreover, the method of the present invention makes it possible to continuously prepare electrically-conductive needle-like zinc oxide at a high reaction rate and at low cost through a simple technical means.

The present invention will further be described in more detail with reference to the following non-limitative working Examples and the effects practically attained by the present invention will also be discussed in detail below.

EXAMPLE 1

Conductive needle-like zinc oxide was prepared in the following manner using the apparatus shown in FIG. 1. Anhydrous aluminum chloride ($AlCl_3$) as a dopant-forming metal compound was blown in a condenser 2 of the apparatus through a nozzle 3 at a predetermined velocity (flow rate) of 0.64 kg/h using an $N_2$ gas-purged oscillating feeder and $N_2$ gas as a carrier. On the other hand, zinc vapor maintained at 910° C. which had been evaporated and refined in a rectifying column 1 for purifying zinc at an evaporation speed of 10 kg/h was introduced into the lower portion of the nozzle 3 through the condenser 2 to give a uniform vapor mixture comprising zinc vapor and $AlCl_3$. This uniform vapor mixture was introduced into an oxidation chamber 5 having an internal chamber length of 3 m at a flow rate of 10.64 kg/h through a vapor mixture-injecting nozzle orifice 4 having an orifice diameter of 80 mm. At this stage, $N_2$ gas was blown in the oxidation chamber through an inert gas-injecting nozzle 6 at a flow rate of 100 Nl/min to thus cover the vicinity of the vapor mixture-injecting nozzle orifice 4 with a nitrogen gas atmosphere. The zinc vapor was stepwise oxidized by injecting air through first to third oxidizing gas-injection nozzles arranged in the oxidation chamber at a flow rate of 50 Nl/min respectively. The resulting needle-like crystals of electrically-conductive zinc oxide were aspirated through an aspiration fan and collected by a bag filter.

Various properties of the resulting electrically-conductive needle-like zinc oxide particles were determined according to the following methods. The results thus obtained are summarized in the following Table 1.

Volume Resistivity:

The resulting electrically-conductive needle-like crystals of zinc oxide were pressure-molded, at a pressure of 2 ton/cm$^2$, into a test piece and the volume resistivity of the test piece was determined using a low resistance-determining device (Loresta, available from Mitsubishi Petrochemical Co., Ltd.).

Figure 3:
FIG. 3 is a scanning electron micrograph illustrating the structures of the needle-like crystals of electrically-conductive zinc oxide prepared in Example 1.

Needle Length:

An electron micrograph of the electrically-conductive needle-like crystals was taken by a scanning electron microscope (SEM) and the needle length thereof was determined based on the microgaphed images thereof. FIG. 3 shows the electron micrograph of the electrically-conductive needle-like zinc oxide prepared in Example 1.

Whiteness:

The L value of the electrically-conductive needle-like zinc oxide obtained was determined by Color Computer (SM-5 Type, available from Suga Testing Machine Co., Ltd.) and was defined to be the whiteness thereof.

EXAMPLES 2 TO 5

Conductive needle-like crystals of zinc oxide were prepared in the same manner used in Example 1 except that gallium chloride (Example 2), indium chloride (Example 3), stannic chloride (Example 4) and previously mixed gallium chloride and stannic chloride (Example 5) were used instead of the aluminum chloride used in Example 1. Various properties of the resulting electrically-conductive needle-like crystals of zinc oxides thus prepared were determined in the same manner used in Example 1. The results thus obtained are listed in Table 1.

EXAMPLE 6

Figure 4:
FIG. 4 is a scanning electron micrograph illustrating the structures of the needle-like crystals of electrically-conductive zinc oxide prepared in Example 6.

The same procedures used in Exampel 1 were repeated except that five oxidizing gas-injection nozzles were used and that the flow rate of air and the length of the oxidizing chamber were changed to those listed in Table 1 to prepare electrically-conductive needle-like crystals of zinc oxide. Various properties of the resulting electrically-conductive needle-like crystals of zinc oxide thus prepared were determined in the same manner used in Example 1. The results thus obtained are listed in Table 1. In addition, FIG. 4 shows a scanning electron micrograph of the electrically-conductive needle-like zinc oxide prepared in Example 6.

TABLE 1

| | Preparation Condition | | | | | | | | | | | | Quality and Properties | | | |
|---|---|---|---|---|---|---|---|---|---|---|---|---|---|---|---|---|
| | Amount of Dopant (part by weight) | | | | Zn Vapor | | Flow Rate of Air Through Nozzles (Nl/min) | | | | | | Length of Oxidizing Chamber | Volume Resistivity | Needle Length | Whiteness | Aspect Ratio |
| Ex. No. | $Al_2O_3$ | $Ga_2O_3$ | $In_2O_3$ | $SnO_2$ | Temp (°C.) | Evaporation Rate (Kg/h) | 1st. stage | 2nd. stage | 3th. stage | 4th. stage | 5th. stage | Total | (m) | ($\Omega \cdot cm$) | (μm) | L* | (L/D) |
| 1 | 2.0 | — | — | — | 910 | 10 | 50 | 50 | 50 | — | — | 150 | 3 | 1.3 × 10 | 3–15 | 96.72 | 2–7 |
| 2 | — | 1.0 | — | — | 910 | 10 | 50 | 50 | 50 | — | — | 150 | 3 | 1.0 × 10 | 3–15 | 97.15 | 2–7 |
| 3 | — | — | 1.0 | — | 910 | 10 | 50 | 50 | 50 | — | — | 150 | 3 | 2.1 × 10 | 3–15 | 96.89 | 2–7 |
| 4 | — | — | — | 1.0 | 910 | 10 | 50 | 50 | 50 | — | — | 150 | 3 | 2.0 × 10 | 3–15 | 96.84 | 2–7 |
| 5 | — | 0.1 | — | 0.5 | 910 | 10 | 50 | 50 | 50 | — | — | 150 | 3 | 1.5 × 10 | 3–15 | 96.88 | 2–7 |
| 6 | 2.0 | — | — | — | 910 | 10 | 30 | 30 | 30 | 30 | 30 | 150 | 5 | 1.0 × 10 | 10–20 | 96.92 | 3–15 |

Aspect Ratio:

The needle length L and the diameter D (as determined at the base portion) of each needle-like crystal were determined on the basis of the scanning electron-micrographed images thereof and the ratio of L to D (L/D) (the aspect ratio) was calculated.

Moreover, the electrically-conductive needle-like crystals of the zinc oxide prepared in Example 1 were chemically analyzed and the aluminum content thereof was found to be 2.0 parts by weight (as expressed in terms of aluminum oxide) per 100 parts by weight of zinc oxide. Furthermore, they were also subjected to an X-ray diffraction analysis and it was found that the peak positions and peak strengths thereof were approximately in agreement with those of the reagent zinc oxide. This clearly indicates that the crystallizability of the resulting electrically-conductive needle-like zinc oxide is identical to that of the reagent zinc oxide and that it is a composite oxide comprising zinc oxide crystals in which aluminium is doped.

We claim:

1. A method for preparing electrically-conductive needle-like zinc oxide consisting of the steps of preparing a vapor mixture by admixing elemental zinc vapor and vapor of at least one dopant-forming metal compound selected from the group consisting of compounds of trivalent and tetravalent metals having boiling points of not more than the boiling point of zinc and free of oxygen atom in an amount of 0.005 to 5 parts by weight, as expressed in terms of oxide of the dopant-forming metal, per 100 parts by weight of the zinc vapor as expressed in terms of zinc oxide; introducing the resulting vapor mixture into an oxidation chamber through a vapor mixture-injecting nozzle; and passing the vapor mixture through the oxidation chamber while blowing an oxidizing gas into the vapor mixture through at least two nozzles spaced apart from one another and arranged along the flow path of the vapor mixture to thus stepwise oxidize the vapor mixture; the amount of the oxidizing gas injected through each of the nozzles spaced apart from one another being selected so that it satisfies the following relation:

$$A\ (\%) = (105 \sim 170)/n$$

(wherein A represents a rate (%) of the amount (equivalent) of the injected oxygen gas relative to the flow rate of zinc vapor and n represents the number of nozzles used and is an integer of not less than 2).

2. The method for preparing electrically-conductive needle-like zinc oxide according to claim 1 wherein the dopant-forming metal compound is a chloride or bromide of Al, Ga, In, Sn, Ge or Si.

3. The method for preparing electrically-conductive needle-like zinc oxide according to claim 1 wherein each electrically-conductive zinc oxide crystal has a three-dimensionally branched needle-like shape having a needle length ranging from 1 to 50 μm and an aspect ratio ranging from 2 to 25.

4. The method for preparing electrically-conductive needle-like zinc oxide according to claim 1 wherein the dopant-forming metal compound is a chloride or bromide of Al, Ga, In, Sn, Ge or Si and each electrically-conductive zinc oxide crystal has a three-dimensionally branched needle-like shape whose needle length ranges from 1 to 50 μm and whose aspect ratio ranges from 2 to 25.

5. The method for preparing electrically-conductive needle-like zinc oxide according to claim 1 wherein the vapor mixture-injecting nozzle orifice is covered with an inert gas atmosphere and the temperature of the nozzle is adjusted to a range of from 700° to 1200° C.

6. The method for preparing electrically-conductive needle-like zinc oxide according to claim 1 wherein the amount of the zinc vapor is controlled to a range of from 3 to 20 kg/h and the flow rate of the inert gas is controlled to a range of from 100 to 200 Nl/min.

* * * * *